(12) United States Patent
Gerber et al.

(10) Patent No.: US 9,527,667 B2
(45) Date of Patent: Dec. 27, 2016

(54) RACK STORAGE DOOR WITH CLOSURE SENSOR

(75) Inventors: Urs Gerber, Bregenz (AT); Konrad Eberle, Bregenz (AT)

(73) Assignee: LTW Intralogistics GmbH, Wolfurt (AT)

( * ) Notice: Subject to any disclaimer, the term of this patent is extended or adjusted under 35 U.S.C. 154(b) by 1375 days.

(21) Appl. No.: 12/954,227

(22) Filed: Nov. 24, 2010

(65) Prior Publication Data

US 2011/0120014 A1    May 26, 2011

(30) Foreign Application Priority Data

Nov. 26, 2009   (AT) ................. A 1875/2009

(51) Int. Cl.
*B65G 1/02*   (2006.01)
*B65G 1/04*   (2006.01)

(52) U.S. Cl.
CPC ............. *B65G 1/02* (2013.01); *B65G 1/0407* (2013.01)

(58) Field of Classification Search
USPC ...... 49/125, 126, 127, 128, 129, 130; 292/9, 292/12, 15, 23, 75, 77, 79, 73; 70/275, 277, 70/278.1, 278.7
See application file for complete search history.

(56) References Cited

U.S. PATENT DOCUMENTS

| | | | | |
|---|---|---|---|---|
| 3,437,363 A * | 4/1969 | Walters | ............ | 292/113 |
| 3,597,034 A * | 8/1971 | Wetzler | ............ | 312/199 |
| 4,502,246 A * | 3/1985 | Minami | ............ | 49/322 |
| 4,872,287 A * | 10/1989 | Block | ............ | 49/449 |
| 6,854,399 B2 * | 2/2005 | Inage | ............ | 105/341 |
| 6,863,001 B2 * | 3/2005 | Inage | ............ | 105/341 |
| 6,983,512 B2 * | 1/2006 | De Oliveira | ............ | 16/97 |
| 7,355,394 B2 * | 4/2008 | Lei et al. | ............ | 324/230 |
| 7,861,475 B2 * | 1/2011 | Sprague | ............ | 52/243.1 |
| 8,136,299 B2 * | 3/2012 | Inage | ............ | 49/118 |
| 2005/0184018 A1 * | 8/2005 | Miyazaki et al. | ............ | 211/162 |
| 2008/0010901 A1 * | 1/2008 | Althammer | ............ | 49/360 |
| 2009/0284024 A1 * | 11/2009 | Deleonardis et al. | ............ | 292/145 |
| 2011/0308164 A1 * | 12/2011 | Terasaki et al. | ............ | 49/360 |

FOREIGN PATENT DOCUMENTS

| | | |
|---|---|---|
| DE | 19733415 A1 | 2/1998 |
| EP | 1 696 095 A2 | 8/2006 |

OTHER PUBLICATIONS

European Search Report dated Mar. 11, 2011.

* cited by examiner

*Primary Examiner* — Katherine Mitchell
*Assistant Examiner* — Shiref Mekhaeil
(74) *Attorney, Agent, or Firm* — Laurence A. Greenberg; Werner H. Stemer; Ralph E. Locher

(57) ABSTRACT

A configuration contains a coupling mechanism for closing a door of a rack store, the door being guided in particular on rails, and an uncoupling and displacing device for opening and displacing the door. The uncoupling and displacing device has a displaceable driver, with which the coupling mechanism can be moved from a closed position into an open position and the door can be displaced. A closure sensor monitors the closed position of the coupling mechanism.

11 Claims, 5 Drawing Sheets

FIG. 2
PRIOR ART
FIG. 4
PRIOR ART
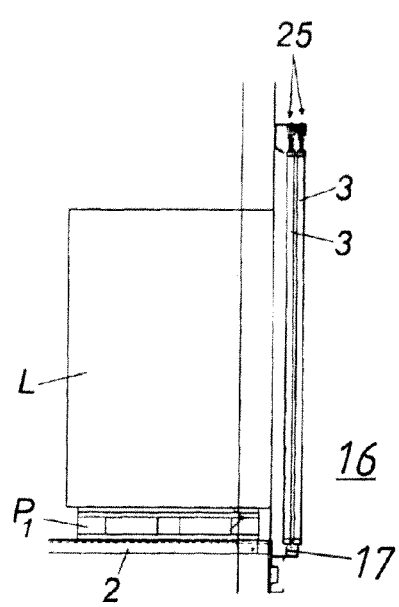
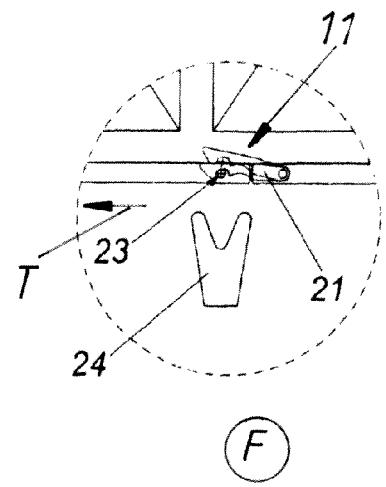
FIG. 3
PRIOR ART
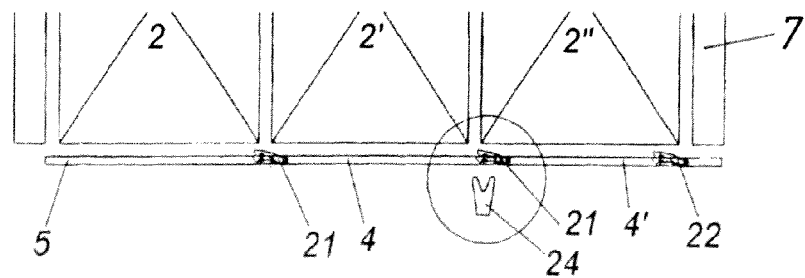

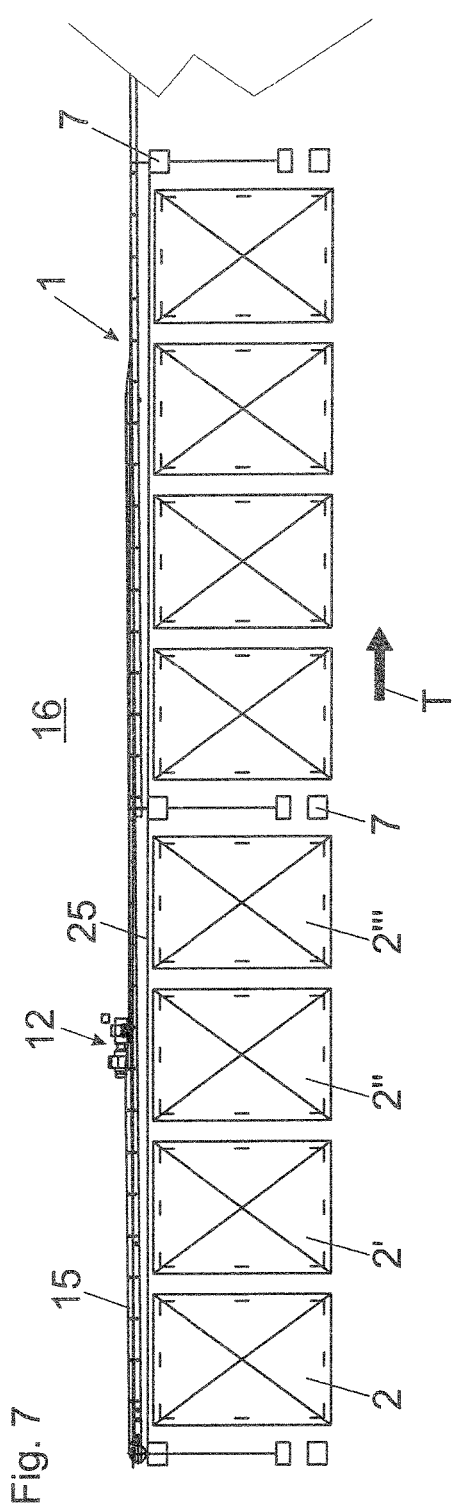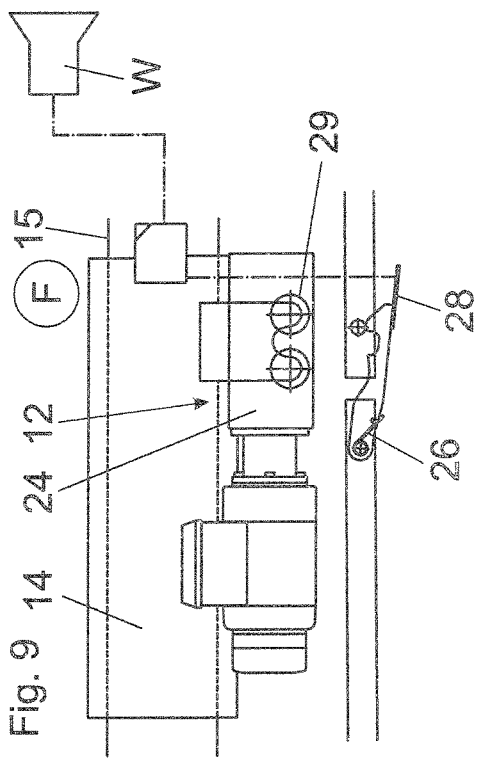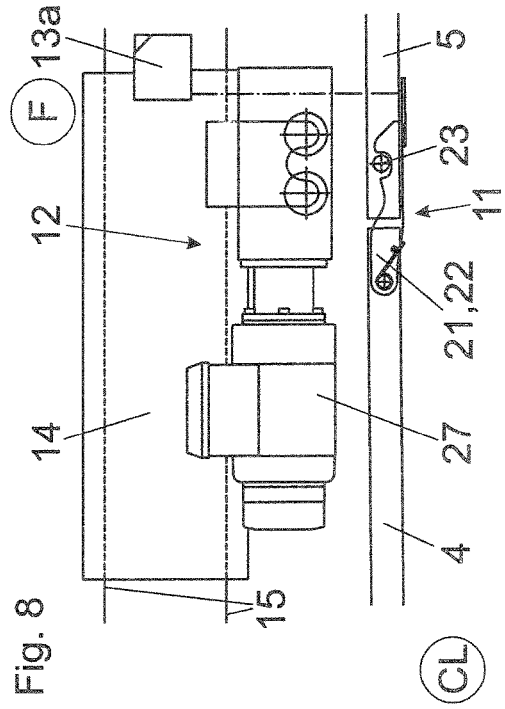

RACK STORAGE DOOR WITH CLOSURE SENSOR

CROSS-REFERENCE TO RELATED APPLICATION

This application claims the priority, under 35 U.S.C. §119, of Austrian application A1875/2009, filed Nov. 26, 2009; the prior application is herewith incorporated by reference in its entirety.

BACKGROUND OF THE INVENTION

Field of the Invention

The invention relates to a configuration that contains a coupling mechanism for releasably closing a door of a rack store, the door being guided in particular on rails, and an uncoupling and displacing device for opening and displacing the door, with which the coupling mechanism can be moved from a closed position into an open position and the door can be displaced, and also to a rack store having a configuration of this kind.

In order to stow away or store storage articles in warehouses, a great variety of systems are already known, wherein, in rows of rack stores, the individual pallet storage spaces for the storage articles are separated from the rack-store aisle by doors or portions of doors, in order to protect the order-picking personnel from automatically traveling storage and retrieval units. The storage and retrieval unit here travels along the rack-store aisle (usually on rails), opens or displaces a particular door and removes the storage article, if a particular storage article is to be removed from a pallet storage space.

By way of example, European patent EP 1 696 095 discloses in this respect a rack store in which a catch-bolt mechanism (coupling mechanism) connects individual door portions which can be separated from one another, displaced and closed again by a driver (uncoupling and displacing device). Sometimes, there is the problem, after closing, of the catch-bolt mechanism not having closed properly, if, for example, the storage article has not been put away quite correctly or the driver has not driven the moved door right into the completely closed position. Such a fault has hitherto been detected by the system only whenever the door is approached or opened again. In the interim, however, this door is at least ajar, which is undesirable.

SUMMARY OF THE INVENTION

It is accordingly an object of the invention to provide a rack storage door with a closure sensor which overcome the above-mentioned disadvantages of the prior art methods and devices of this general type, in which improper closing or a fault during the closing of doors should be detected immediately.

With the foregoing and other objects in view there is provided, in accordance with the invention a configuration containing a coupling mechanism for releasably closing a door of a rack store, the door being guided on rails; an uncoupling and displacing device for opening and displacing the door, and with which the coupling mechanism can be moved from a closed position into an open position and the door can be displaced; and a closure sensor monitoring the closed position of the coupling mechanism.

Malpositioning of the coupling mechanism after—unsuccessful—closing can thus be detected, and, for example, a further automatic closing attempt can then be carried out to remedy this, or the problem can be remedied manually by an operator.

Although such a closure sensor can be provided for each coupling mechanism, it is preferably provided that the closure sensor is part of the uncoupling and displacing device. Since the uncoupling and displacing device is preferably arranged on a storage and retrieval unit which travels along a rail of a rack-store aisle, only one closure sensor and one uncoupling and displacing device are thus required per rack-store aisle. The rail for the storage and retrieval unit to travel on can be arranged, for example, on the floor of the rack-store aisle. However, it can also be provided that, above the doors, along the rack-store aisle, a dedicated rail is attached to the racks or rack uprights and the uncoupling and displacing device travels on this rail. Instead of a storage and retrieval unit, a displacement carriage or the like can also be provided in the rack store.

It is preferably provided that the door contains at least two portions and one connecting coupling mechanism per portion.

It can particularly preferably be provided that the coupling mechanism contains a latching lever and a connecting element as a counterpart to the latching lever, wherein the latching lever is arranged on a rack upright or on a first portion of the door and the connecting element is arranged on a second portion of the door, wherein—as is also known from the prior art—the latching lever is arranged in a pivotable manner on the first portion or on the rack upright, and such that it is spring-loaded in the closing direction, and the connecting element is arranged as a peg-like extension on the second portion. Alternatively, it would also be possible to provide another latching connection, in which there is provided in the second portion a latching recess in which the latching lever can engage. Alternatively, there can also be magnetic or other coupling mechanisms in which a closure sensor can compare the closed position before and after opening and if appropriate emits a warning signal. In the embodiment of the coupling mechanism as a catch-bolt mechanism, this being the preferred embodiment of this invention, the closure sensor monitors the position of the latching lever (catch).

According to a very particularly preferred exemplary embodiment, it can be provided in this respect that the closure sensor is in the form of a distance sensor which detects the distance to the coupling mechanism, preferably by use of laser beams. Monitoring takes place here in that the distance sensor stores the distance to the latching lever of the coupling mechanism in the closed position before each opening of the coupling mechanism, compares it with the distance in the closed position after the closure of the coupling mechanism and emits a warning signal if the distance to the latching lever changes. After this—as already mentioned—for example the closing procedure can be repeated or an operator can remedy the problem.

As is known from the prior art, the uncoupling and displacing device can have a driver, which can preferably be pivoted along a pivot axis, aligned parallel to the rail of the rack-store aisle, from a freewheeling position into a displacement position, wherein at least a portion of the door can be displaced by the driver in this displacement position. What is essential here is that the uncoupling and displacing device on the one hand releases the coupling mechanism and on the other hand drives the desired door(s) in a displaceable manner, wherein the uncoupling and displacing operations can preferably be carried out by the driver, which releases the coupling mechanism, for example by a movement oriented substantially transversely to the rack-store direction, as a result of which it passes from the freewheeling position into the displacement position and can thus displace the desired doors. In a particularly simple configuration, the driver can displace the portion of the door via the connecting element arranged on the portion.

Protection is also sought for a rack store which has at least one door for separating (or for openably closing) a pallet storage space from a rack-store aisle and has an configuration as recited above.

In such a rack store, it can particularly preferably be provided that a plurality of pallet storage spaces are assigned a door, wherein the door has at least two portions, which can be opened optionally jointly, individually or in groups, wherein one portion of the door is provided per pallet space and the portions can be coupled releasably together.

With the foregoing and other objects in view there is provided, in accordance with the invention a method for connecting, opening, closing and displacing portions of doors of a rack store having a configuration containing a coupling mechanism for releasably closing the doors, an uncoupling and displacing device for opening and displacing the doors, and with which the coupling mechanism can be moved from a closed position into an open position and the doors can be displaced, and a distance sensor monitoring the closed position of the coupling mechanism, The method includes measuring a distance between the distance sensor and a latching lever, storing the distance, and releasing or uncoupling the coupling mechanism by moving a driver from a freewheeling position into a displacement position. The latching lever, which is under spring loading, is released from the connecting element. At least a portion of a door is released by the driver of the uncoupling and displacing device. The coupling mechanism is closed or engaged by moving the driver from the displacement position into the freewheeling position, wherein the latching lever, which is under spring loading, latches on the connecting element again. A further distance between the distance sensor and the latching lever is measured. The further distance is compared with the distance stored before releasing or uncoupling of the coupling mechanism. A warning signal is emitted if the further distance, measured after the closing or engaging operations, between the distance sensor and the latching lever deviates from the distance, measured before the releasing or uncoupling operations, between the distance sensor and the latching lever.

Other features which are considered as characteristic for the invention are set forth in the appended claims.

Although the invention is illustrated and described herein as embodied in a rack storage door with a closure sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 1 to 4 are illustrations showing a rack-store arrangement according to the prior art;

FIG. 7 is a diagrammatic, plan view of the rack store;

FIG. 8 is an illustration showing the arrangement according to FIG. 5 with a storage and retrieval unit;

FIG. 9 is an illustration showing the arrangement according to FIG. 6 with a storage and retrieval unit and a warning signal being emitted;

DETAILED DESCRIPTION OF THE INVENTION

FIGS. 1 to 4 show a rack store as is substantially already known from European patent EP 1 696 095. All the embodiments mentioned in EP 1 696 095 can also be used in their entirety for the present invention. EP 1 696 095 is therefore incorporated by reference in its entirety herein.

Figure 1:
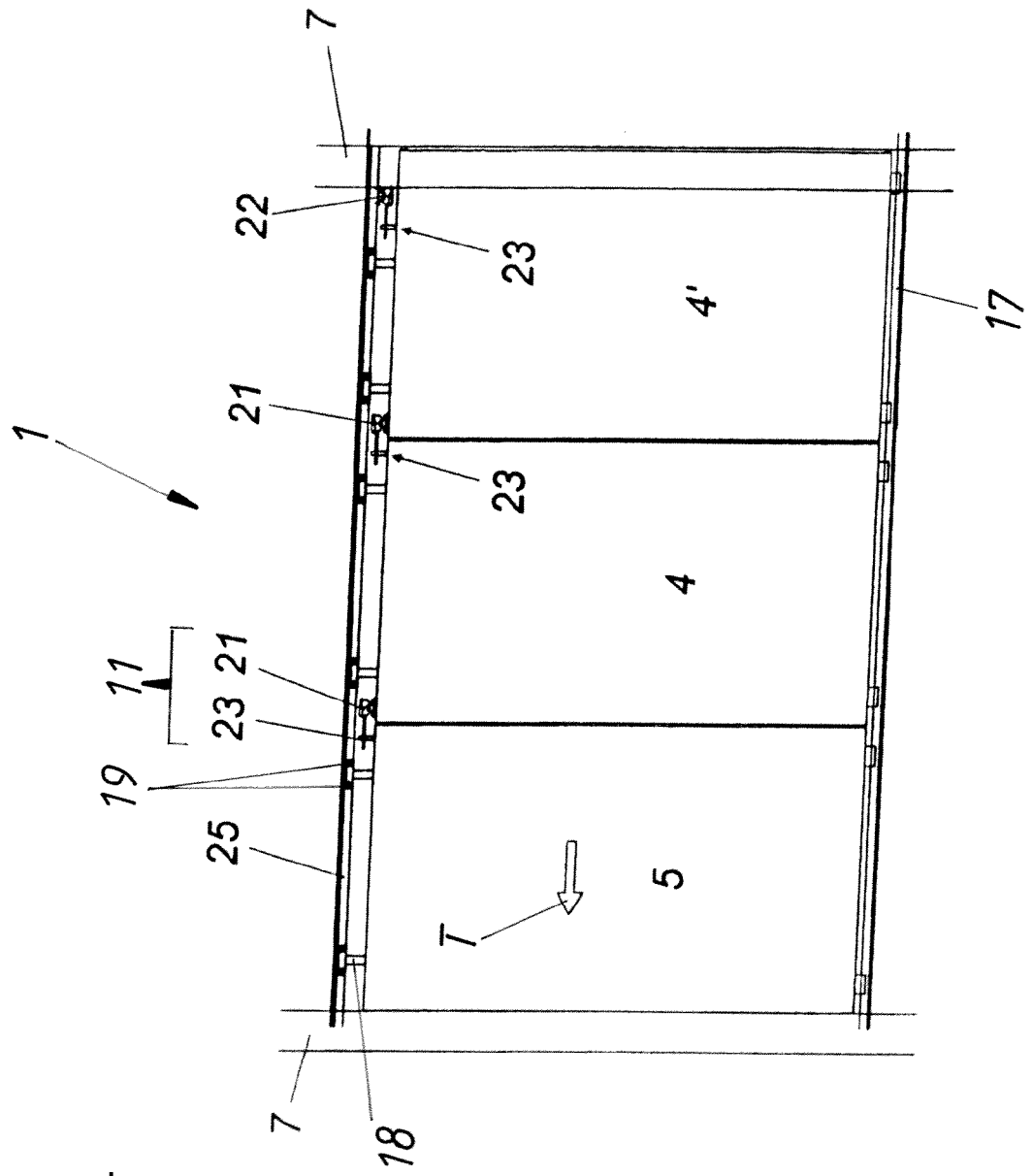

FIG. 1 here shows a front view of a rack-store door 3, which consists of the portions 5, 4 and 4'. These portions 5, 4 and 4' are guided in a displaceable manner along a rail 25 fastened to rack uprights 7. In the region of the floor, a floor guide rail 17 can likewise be mounted on the store floor, as a result of which the individual doors 3 or the portions 5, 4, 4' can be prevented from pivoting out (see FIG. 2). The individual portions 5, 4 and 4' are guided in the rail 25 in each case via two guide members 18 having rollers 19. The individual portions 4 and 4' and 5 and 4, respectively, are connected by a coupling mechanism 11, which is formed of a latching lever 21, which is fastened to the door 4 or 4', and of a connecting element 23, which is arranged on the portions 5, 4 and 4' and is preferably in the form of a bolt-shaped holding extension. A latching lever 22 for the first portion 4' of the door 3, as seen in a door-opening direction T, can be attached, for example, to the rail 25 or the door upright 7.

FIG. 2 shows a section through the rack store 1, wherein a pallet $P_1$, with a storage article L located thereon, has been set down or stored in the pallet storage space 2. The pallet storage space 2 is separated from the rack-store aisle 16 by at least one door 3, wherein the individual doors 3 are guided in a displaceable manner on profile-form rails 25 and the floor guide rail 17.

FIG. 3 illustrates a view from above of three pallet storage spaces 2, 2' and 2", which are arranged next to one another and to which in each case a portion 5, 4 or 4' of the door 3 is assigned. In this case, the coupling mechanism 11 is illustrated in both the open and in the closed positions.

Figure 11:
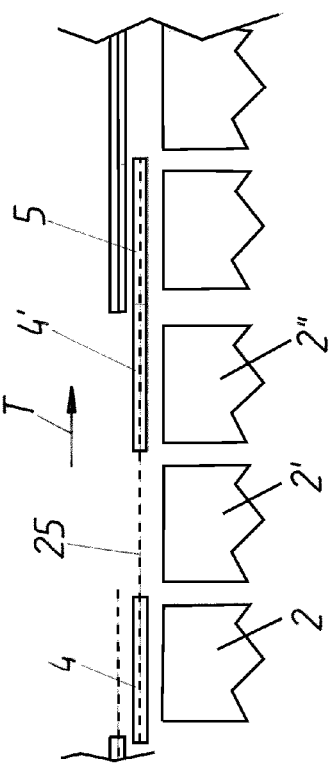
FIG. 11 is a diagrammatic, plan view of a rack store according to the prior art.

FIG. 4 shows a detail of FIG. 3, wherein at least a fork-like driver 24 of the uncoupling and displacing device 12 is illustrated in a freewheeling position F. The driver 24 can be moved in the direction of the coupling mechanism 11 transversely to the orientation of the doors 3, as a result of which the latching lever 21 can move from the closed position CL into the already indicated open position OP, after which, by means of a displacement movement parallel to the orientation of the doors 3, the driver 24 displaces at least one portion 4, 4', 5 of the door 3 via the connecting element 23 (displacement position V). Matching this, in FIG. 11—without a coupling mechanism 11 and uncoupling and displacing device 12—the door 3 is shown in the open position OP, wherein, by releasing the coupling mechanism 11 between the portions 4 and 4', the two portions 4' and 5 are displaced along the rail 25 in the door opening direction T by the uncoupling and displacing device 12. As a result, it is possible for a storage and retrieval unit 14 (not illustrated here) to gain access to the pallet storage space 2'.

Figure 5:
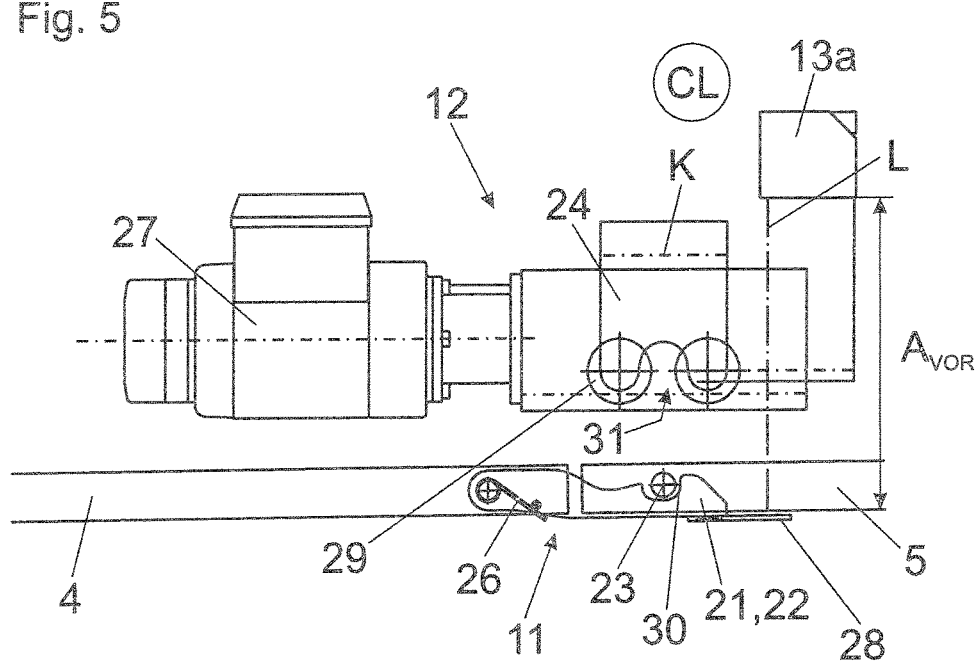
FIG. 5 is an illustration showing an uncoupling and displacing device in a freewheeling position and a coupling mechanism in a closed position.

FIG. 5, then, shows a particularly preferred exemplary embodiment of an arrangement according to the invention in a plan view. This arrangement consists substantially of an uncoupling and displacing device 12, a closure sensor 13 (in particular a distance sensor 13a) and the coupling mechanism 11, which releasably connects individual portions 4 and 5 of a rack-store door 23. In FIG. 5, the coupling mechanism 11 is illustrated in the closed position CL, wherein the latching lever 21, 22 is mounted pivotably on the portion 4 and, via a recessed region 30, holds a connecting element 23, which is attached to the portion 5, by a spring 26, which is biased in the closing direction SR.

The latching lever 21, 22 has a measuring extension 28, to which the distance $A_{VOR}$, prior to the coupling mechanism being opened, is determined and stored by the distance sensor 13a by a laser beam L.

Figure 10:
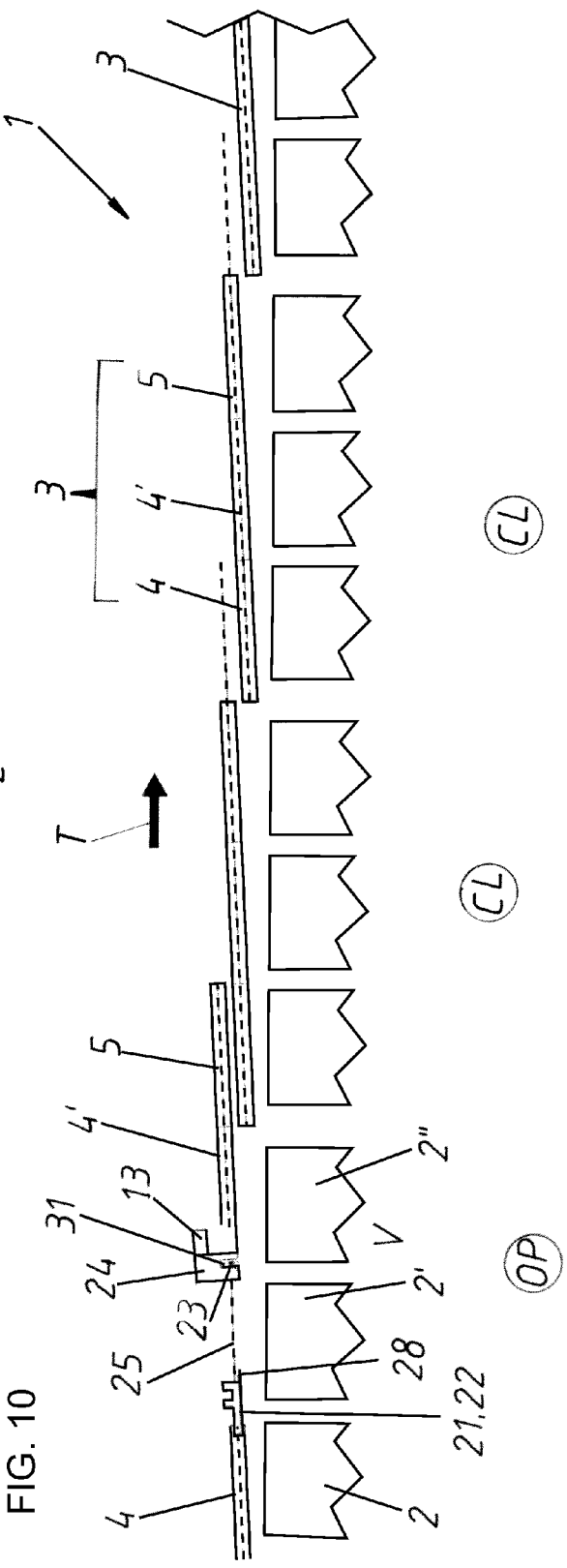
FIG. 10 is a diagrammatic, plan view of the rack store with a door portion in the open position and the driver in the displacement position.

The uncoupling and displacing device 12 has the driver 24 having a fork-like accommodating region 31, formed between two rollers 29, and it is driven by a driver drive 27. In order to release the coupling mechanism 11, the driver 24 is pivoted along a pivot axis K and moved in the direction of the coupling mechanism 11, as a result of which the latching lever 21, 22 is moved away from the connecting element 23 counter to the spring force 26 via the rollers 29, as a result of which the connecting element 23 passes between the two rollers 29 and into the accommodating region 31 of the driver 24 in the displacement position V (not illustrated here, but see FIG. 10).

Figure 6:
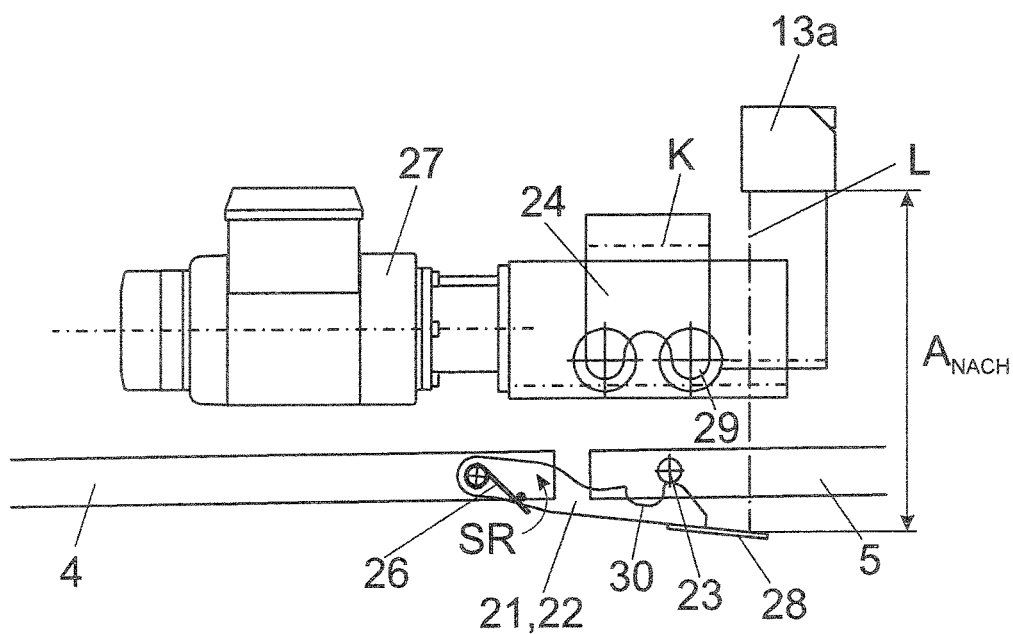
FIG. 6 is an illustration showing the uncoupling and displacing device in the freewheeling position and the coupling mechanism after unsuccessful closing.

If, after—at least attempted—closing, as in FIG. 6, the latching lever 21, 22, despite the spring 26, can no longer snap in correctly at the connecting element 23 by way of the recess 30, the distance $A_{NACH}$ is greater than the distance $A_{VOR}$ stored in the distance sensor 13a. If these distances $A_{VOR}$ and $A_{NACH}$ are different, the distance sensor 13a, or a control or regulating unit for the arrangement as a whole, this unit being connected to the sensor, emits a warning signal W (see also FIG. 9).

As shown in FIGS. 8 and 9, the uncoupling and displacing device 12, including the closure sensor 13, can be part of a storage and retrieval unit 14, which is guided on rails 15 in the rack-store aisle 16. The driver 24 in each case here is illustrated in the freewheeling position F and, at least in FIG. 9, the closed position CL of the coupling mechanism 11 has not been fully reached.

Alternatively—as illustrated in FIG. 7—the uncoupling and displacing device 12 can travel on a separate rail 15 which is not coupled to the storage and retrieval unit 14—and is mounted, for example, on the rack uprights 7. Preferably, all the procedures of the arrangement shown here or of the rack store shown here are controlled or regulated by an automatic control or regulating unit.

Thus, the invention explained here presents an arrangement which improves the safety requirements of a rack store and ensures the closed position of a coupling mechanism (catch-bolt mechanism). The closure sensor—in particular a distance sensor—according to the invention monitors the closed position and emits a warning signal if a door of a pallet storage space has not closed properly. In this case, the closure sensor measures the actual distance to a part, preferably the latching lever of the coupling mechanism, and stores this. When the coupling mechanism closes again, the distance to this latching lever is measured again. If this value differs from the stored value, a message is transmitted, since the mechanism has apparently not closed properly. Following this, the fault can be remedied automatically, or manually by a worker, after which the storage and retrieval unit can move on and unimpeded operation of the rack store as a whole can be continued.

The invention claimed is:

1. A configuration, comprising:
 a coupling mechanism for releasably closing a door of a rack store, the door being guided on rails;
 an uncoupling and displacing device for opening the door, said coupling mechanism can be moved from a closed position into an open position and the door can be displaced between a closed position and an open position; and
 a closure sensor monitoring the closed position of said coupling mechanism, said closure sensor being movable relatively to the rails.

2. The configuration according to claim 1, wherein said closure sensor is part of said uncoupling and displacing device.

3. The configuration according to claim 1, wherein said uncoupling and displacing device is disposed on a storage and retrieval unit which travels along a rail of a rack-store aisle.

4. The configuration according to claim 1, wherein the door comprises at least two portions and one said coupling mechanism per portion.

5. The configuration according to claim 4, wherein each said coupling mechanism has a latching lever and a connecting element as a counterpart to said latching lever, wherein said latching lever is disposed on a rack upright or on a first portion of the door and said connecting element is disposed on a second portion of the door.

6. The configuration according to claim 5, wherein said latching lever is disposed in a pivotable manner on the first portion or on the rack upright, such that it is spring-loaded in a closing direction, and said connecting element is disposed as a peg-shaped extension on the second portion.

7. The configuration according to claim 5, wherein said closure sensor monitors a position of said latching lever.

8. The configuration according to claim 4, wherein said uncoupling and displacing device has a driver aligned parallel to a rail of a rack-store aisle, and can move from a freewheeling position into a displacement position, wherein the door, or at least a portion of the door, can be unlatched by said driver in the displacement position.

9. The configuration according to claim 8, wherein said driver displaces the portion of the door via said connecting element disposed on the portion.

10. The configuration according to claim 1, wherein said closure sensor is a distance sensor which detects a distance to said coupling mechanism by means of laser beams.

11. The configuration according to claim 10, wherein said distance sensor stores a distance to said latching lever of said coupling mechanism in the closed position before each opening of said coupling mechanism, compares it with a distance in the closed position after a closure of said coupling mechanism and emits a warning signal if the distance to said latching lever changes.

* * * * *